United States Patent [19]

Ih

[11] 4,266,846

[45] May 12, 1981

[54] TWO-DIMENSIONAL SCANNERS

[75] Inventor: Charles S. Ih, Newark, Del.

[73] Assignee: University of Delaware, Newark, Del.

[21] Appl. No.: 961,652

[22] Filed: Nov. 17, 1978

Related U.S. Application Data

[63] Continuation-in-part of Ser. No. 757,901, Dec. 28, 1976, abandoned.

[51] Int. Cl.$^3$ .......................................... G02B 27/17
[52] U.S. Cl. ..................................... 350/3.71; 350/6.5
[58] Field of Search ..................... 350/3.71, 6.5–6.91, 350/162 ZP; 358/130–132, 127, 199, 202–206, 285, 292, 293, 296–300, 362

[56] References Cited

U.S. PATENT DOCUMENTS

| | | | |
|---|---|---|---|
| 1,789,686 | 1/1931 | Ranger | 358/205 |
| 1,962,474 | 6/1934 | Baird | 358/203 |
| 1,970,310 | 8/1934 | Ives | 358/205 |
| 1,979,840 | 11/1934 | Peck | 358/205 |
| 2,006,124 | 6/1935 | Baird | 358/205 |
| 3,614,193 | 10/1971 | Beiser | 350/7 |
| 3,619,033 | 11/1971 | McMahon | 350/162 ZP |
| 3,721,487 | 3/1973 | Pienchard et al. | 350/7 |
| 3,795,768 | 3/1974 | Locke | 358/132 |
| 3,953,105 | 4/1976 | Ih | 350/162 ZP |

Primary Examiner—John K. Corbin
Assistant Examiner—Bruce Y. Arnold
Attorney, Agent, or Firm—Mortenson & Uebler

[57] ABSTRACT

A two-dimensional serial and field multiplexing holographic scanner is provided which is provided with multiple rows of holograms on the disk to achieve serial multiplexing and with means to shift or tilt an auxiliary reflector to focus the scanning beam on entirely new field points so as to achieve field multiplexing. The provision of both serial and field multiplexing provides a higher resolution scan of the object than otherwise obtainable. The scanner comprises a rotating disc that has recorded on it a plurality of holograms positioned on the disc face in multiple rows. Each hologram is particularly placed on the disc and focused to a specific object point. In a given row, each hologram is focused at a different longitudinal point on the object to be scanned. An auxiliary reflector is also provided, which is positioned in front of the rotating disc and within the outside diameter of the outermost holograms on the disc. The auxiliary reflector may be tilted or shifted by means of a piezo-electric drive. Upon completion of one revolution of the disc, or upon completion of a set of multiple revolutions equal to the number of rows of holograms on the disc, or upon any desired number of revolutions, the auxiliary mirror may be shifted (or tilted), and thus, upon the second set of revolutions of the disc, the holograms on the disc scan an entirely new field of points, both longitudinally and laterally on the object to be scanned.

6 Claims, 8 Drawing Figures

TWO-DIMENSIONAL SCANNERS

CROSS REFERENCE TO RELATED APPLICATIONS

This application is a continuation-in-part of my earlier, copending application Ser. No. 757,901, filed Dec. 28, 1976, now abandoned.

BACKGROUND OF THE INVENTION

Spinning optical scanners are the subject of such patents as disclosed in the applicant's U.S. Pat. No. 3,953,105 and involve a plurality of holograms recorded on a rotating surface. Recent advances have been directed toward the development of what may be called two-dimensional scanners. In such devices, the surface or object being scanned is being scanned laterally and longitudinally, and the two-dimensional name is apt. In such systems, high speed, high resolution and high reliability coupled with simplicity and low cost are factors investigators are seeking to supply. These image-producing systems use energy sources such as a laser in the visible, ultra-violet and infra-red range, millimeter and micro-waves as well as ultrasonics. While such sources may be used within the principles of this invention, the invention will be described with particular reference to the use of the laser beam in the visible region.

Because of its high intensity and capability of being focused to a small spot, the use of the laser beam in scanning is becoming increasingly important in high-speed interfacing of two-dimensional information with computational and communication systems. If laser scanning systems can be greatly reduced in cost and complexity, as, for example, in the manner described here, such systems might also be incorporated in high resolution display systems.

In prior art devices, multifaceted pyramidal mirrors are frequently used despite many problems involved. For example, conventional rotating mirror scanners can provide a one-dimensional scan in the direction of rotation. A complicated arrangement, however, is needed to provide two-dimensional scans. High precision is often required for these scanners and it is achieved and maintained entirely by mechanical means. For these reasons these scanner systems are not only very expensive, but are also unreliable and difficult to operate. They are also burdened by a number of manufacturing problems. For extreme high-speed operation, the mirror-surface deformation and air turbulence caused by the facet edges seriously affect the performance of such mirror scanners.

The use of holograms to replace mirrors as scanners has been suggested and demonstrated recently. Holographic scanners have essentially removed most of the manufacturing problems associated with mirror scanners. The difficulty for providing a high resolution, two-dimensional scan, however, remains unchanged.

Thus, it is an object of this invention to provide two-dimensional scanners at low cost and simple operation. Another aim is the provision of such a scanning system that is, in effect, a single scanning system that automatically provides two-dimensional scanning. A further purpose is to provide a system using a plurality of holograms and a laser beam. A still further objective is the affording to the public auxiliary equipment, such as a photodetector, to convert light signals to electrical signals for transmission to distant points. An additional aim is providing at a distant point a similar scanning system of this invention to function as a receiver with a modulator to act upon a photosensitive film at said distant point. These and other objects will appear by reference to the discussion below and to the drawings which are given for illustrative purposes only and are not limitative of the principles of this invention.

SUMMARY OF THE INVENTION

Apparatus is provided for achieving two-dimensional holographic scanning of an object comprising:

(a) a rotatable disc having a face, the disc being rotatable about an axis perpendicular to the face of the rotatable disc, and means for effecting rotation of the disc;

(b) a plurality of holograms secured upon the disc face, each hologram capable of focusing coherent radiation from a light source of coherent radiation to a specific point on an object;

(c) a light source of coherent radiation illuminating the holograms as they pass through the light beam of coherent radiation during rotation of the disc, light being diffracted during operation of the scanning device to each focus point of each hologram on the object;

(d) an auxiliary reflector located in the path of the diffracted light and reflecting the diffracted light to the object to be scanned; and (e) means for changing the position of the auxiliary reflector so as to change the position of the point of focus of each hologram on the object to be scanned, whereby, during the first set of revolutions of the disc a first field of points on the object is scanned, and the position of said auxiliary reflector is then changed, thereby displacing the focus points of the holograms on the object such that, upon the second set of revolutions of the disc, a second field of points on the object is scanned, and so on, thereby achieving two-dimensional field and serial multiplex scanning of the object.

Also provided is apparatus as above, but wherein the holograms during recording, were exposed to a fixed-position pilot object point, the location of which point during scanning is sensed by optical detectors, which apparatus also includes optical detectors and a closed servo feedback control system for sensing the output of the detectors and adjusting the position of the auxiliary reflector to fix the position of the pilot object point in space using the said means for changing the position of the auxiliary reflector, thereby eliminating scanning aberrations due to mechanical imperfections in the rotating disc.

In the apparatus the auxiliary reflector is located at a position in front of the face of the disc between the outer diameter of the circle travelled by the outermost holograms on the disc and the axis of rotation of the disc.

In addition, a method is provided for achieving two-dimensional holographic scanning of an object comprising:

(a) securing upon the face of a rotatable disc a plurality of holograms;

(b) focusing each hologram to a specific point on an object to be scanned;

(c) rotating the disc;

(d) illuminating the holograms with a light source of coherent radiation, the holograms being so illuminated as they pass through the light during rotation of the disc;

(e) causing light diffracted from the holograms to be reflected to the object to be scanned using an auxiliary reflector, thereby achieving serial multiplex scanning of the object; and (f) changing the position of the auxiliary reflector in order to change the position of the point of focus of each hologram on the object to be scanned, whereby, during the first set of revolutions of the disc a first field of points on the object is scanned, and the position of the auxiliary reflector is then changed, thereby displacing the focus points of the holograms on the object such that, upon the second set of revolutions of the disc, a second field of points on the object is scanned, and so on, thereby achieving two-dimensional field and serial multiplex scanning of the object.

Also provided is the method above described and including:

(a) exposing the holograms during recording to a fixed-position pilot object point;

(b) sensing the location of the pilot object point during scanning using optical detectors;

(c) sending the output signal from the optical detectors through a closed servo feedback control system to the auxiliary reflector positioning means and thereby adjusting the position of the auxiliary reflector to fix the position of the pilot object point in space, thereby eliminating scanning aberrations due to mechanical imperfections in the rotating disc.

In the above method, the auxiliary reflector is located at a position in front of the face of the disc between the outer diameter of the circle travelled by the outermost holograms on the disc and the axis of rotation of the disc. In this arrangement, the object beam spread and aberration is reduced, and efficient use of the hologram area is achieved. Such arrangement permits the use of a projection lens having a very large effective aperture and the lens can be placed very close to the auxiliary reflector. By this method, the resolution of the scanner is greatly increased to an extent not previously possible.

DETAILED DESCRIPTION OF THE INVENTION WITH REFERENCE TO THE DRAWINGS

Figure 1:
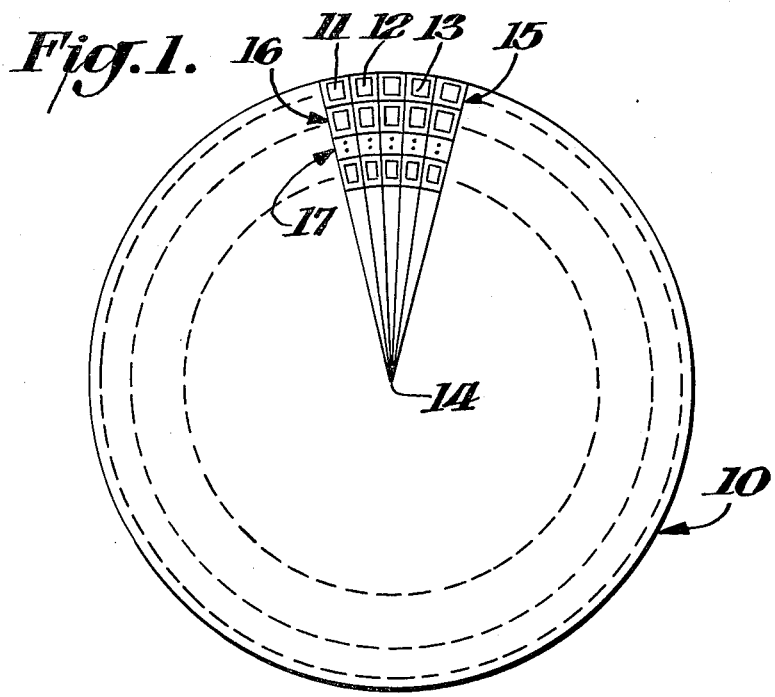
FIG. 1 is a plan view of the disc element to be rotated, showing recorded thereon an arrangement of the holograms in multiple rows.

The purposes of this invention are accomplished by the provision of a rotating disc element (also called "scanner" herein) having positioned on its surface a plurality of recorded holograms as shown in FIG. 1, each of which has been constructed to be a reflective surface diffracting a beam of light to the auxiliary reflector, then to a series of specific points on the object to be scanned, each hologram having assigned to it one of the specific points. As the holograms move due to the rotation of said element, each focal point of each respective hologram will also move thereby scanning the object laterally. As this movement occurs a given line on said object is scanned. In conjunction with said object is a photodetector, 60, that converts the light signal received to an electrical signal which may be transmitted to a distant place for reconversion into an image of the object, or directed to a computer for processing, such as a supermarket check-out counter. Such remote receiving or processing means are represented schematically by box 62 for simplicity. As mentioned above, a modulating system utilizing a similar scanner can be provided at the distant place to reproduce the image.

As shown in FIG. 1, the circular disc 10 is provided with a hologram 11 at its outer periphery. Adjacent to it is hologram 12 and adjacent thereto hologram 13 and so on all around the outer periphery, if desired. All of these, as shown, are preferably equidistant from the center 14 of the disc, though they need not be. Further, the rotating element need not be circular in shape, for any shape may be used though the circle is preferred, of course, for balance and simplicity. Since each hologram constitutes a reflective device made specially to diffract light to a specified point, each effects that reflection independently of the shape or size of the disc. Generally, the disc has a flat or concave surface. For the purposes of the invention it may be understood that the disc 10 shown in FIG. 1 is a flat disc. It is usually constructed of a light-weight material and may be metallic or made of one of the many synthetic polymers. In any event, it is coated with a light-sensitive or photo-sensitive material such as a photo-resist, a photopolymer or thermoplastic. Each of the holograms in FIG. 1 comprises a small area. In making such a hologram, prior to use in the scanner of this invention, that small area is simultaneously illuminated by two beams. One is called a reference beam and is directed perpendicular to the plane of said area and corresponds to the laser or such other wave source which is to be used in the scanning. The other beam is called an object beam. It comes from a point light source which is located at the point where the object is to be scanned. The point light source is generally directed to a convex mirror, the auxiliary reflector, the center of radius of its curvature being exactly on the axis about which the disc is to be rotated. The light from the object point light source goes from the auxiliary reflector to the hologram area at an angle. After such exposure of the hologram, the developing is done. During the later scanning, the reference beam, now termed the reconstruction beam, is diffracted by the developed hologram at the same angle, thus illuminating the point from which came the object beam used in the prior construction of the hologram.

In the preparation of the holograms described above, photo-resist was used on each, it being understood that other materials can be used. For more details on hologram preparation, one may consult such patents as U.S.

Pat. Nos. 3,614,193 and 3,721,487. Photo-resist has been used here because holograms recorded on photo-resist are in relief phase form, which form has high reconstruction efficiency both as to reflection and transmission. Further, holograms from photo-resist material can be faithfully replicated.

If one uses a transmission hologram for the purposes of this invention, he can then use photographic emulsions in preparing the holograms. The diffractive devices described above are preferred.

Normally, the wave front reflected from (or image formed by) a spherical mirror at a large angle is greatly distorted. However, for the applications discussed here, this distortion is completely and automatically compensated during the reconstruction over the entire scanning range. This is so because the rays retrace their respective paths travelling in the reverse direction over the original optical paths. Also, since the entire scanner system, including the auxiliary reflector, possesses central symmetry with respect to the axis about which the spinner rotates, compensation occurs over the entire scanning range.

With the understanding that hologram 11 in FIG. 1 has just been prepared by a procedure such as described above through the point of applying simultaneously the reference beam and the object beam, one should understand that, after exposing hologram 11, the object point light source is displaced slightly and hologram 12 is recorded. The displacement is repeated to expose hologram 13, and each displacement made is normally equal to one resolution line width. As can be seen in FIG. 1, the peripheral row 15 of holograms 11, 12, etc., has adjacent to it positioned closer to the center a row 16 of holograms and that is followed by row 17 and so on to the center point. Each of the photo-resist areas in each respective row is constructed just as described above to produce in each row a hologram that in the scanning operation reflects light back to its respective object point. When the exposure of the last hologram to be recorded is effected, the entire lot is developed.

Figure 4:
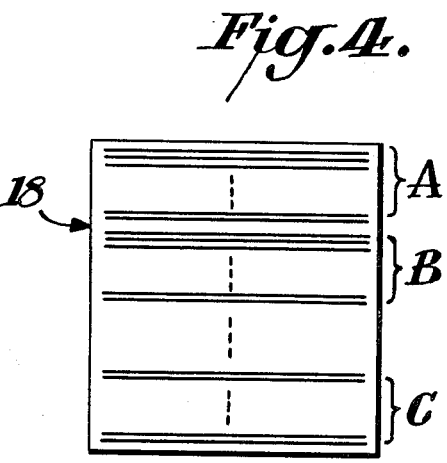
FIG. 4 is a diagrammatical sketch showing the respective lines on the surface of the object that are scanned by the scanner of FIG. 3 (or FIG. 2).

Thus, in scanning, upon rotation of the spinner, the outer peripheral row will normally scan lines A on object 18 as shown in FIG. 4, which figure is a possible scan pattern, while the second row 16 will normally scan the lines in group B, and so on, the scanning being effected transversely by rotation of the disc and longitudinally due to the offset focal points of the holograms in a given row and row-to-row, and all going on in proper sequence. Other scanning patterns are possible. It is to be understood that object 18 may be a document, as, for example, an unlined sheet of paper with handwriting on it. The lines shown on FIG. 4 are imaginary lines representing the scanning motion of the light beam as reflected from sequentially illuminated holograms. It is also to be understood that the laser beam or other coherent radiation is directed to one row of holograms during one revolution normally, and is moved to direct light to a second row upon a second revolution, and so on.

Figure 2:
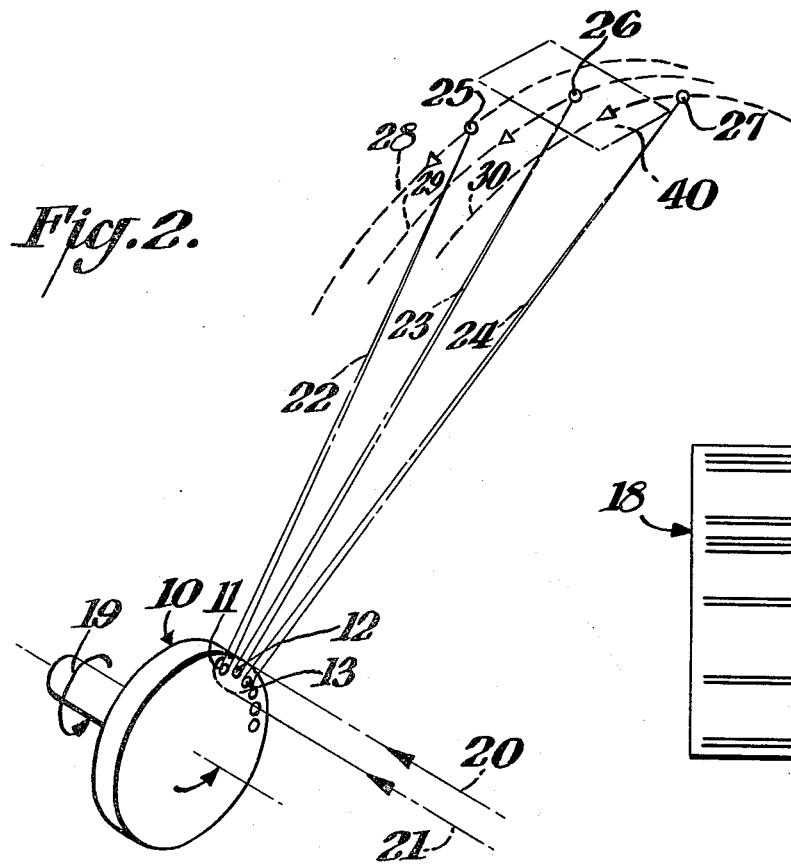
FIG. 2 is a diagrammatic view in which the rotatable element of FIG. 1 has been mounted for rotation and in which a laser beam is being diffracted to the surface being scanned, the auxiliary reflector of this invention being omitted from this figure and only one row of holograms being included for clarity of illustrating two-dimensional scanning.

In order to graphically show what is occurring during scanning, FIG. 2 has been supplied, omitting for clarity the auxiliary reflector normally used. As can be seen, spinner or disc 10 is mounted on axle 19 which is rotating in the direction shown by the arrow. For convenience, only the peripheral row of holograms is shown and only a few in that row are depicted. A laser beam defined by lines 20 and 21 is directed to illuminate an area of the peripheral row commensurate with the width of the beam and, of course, sufficient to illuminate holograms in that area. At the instant shown in FIG. 2, holograms 11, 12 and 13 are shown as illuminated, each diffracting the light received from the laser beam by respective paths 22, 23, and 24 to respective points 25, 26 and 27. Each of these points is on the surface of object 18 which has been placed in a generally curved configuration corresponding to the curving path of light recreated by the hologram as shown by respective dotted lines 28, 29 and 30. The direction of travel of each curving path of light is indicated by an arrow. As disc 10 rotates, point source light 25 moves to the left as do all others and the object is completed scanned across its width and length.

As can be shown from the above, the total resolution of the scanner system is dependent upon the size of the rotating element 10. It can have positioned upon it many holograms. Thus, if it has one thousand holograms, a single revolution of the element will produce a one-thousand-line raster scan.

Figure 3:
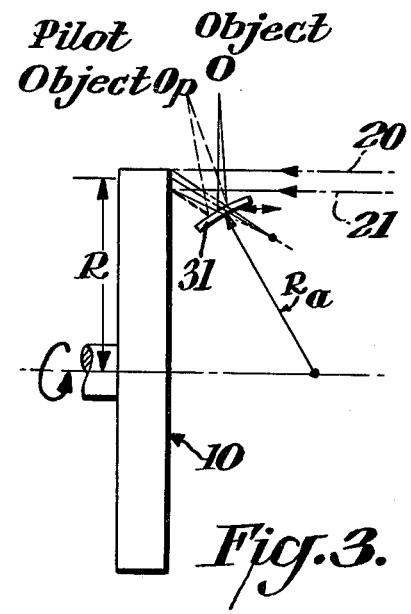
FIG. 3 is similar to FIG. 2 but includes an auxiliary reflector to effect beam position control precisely to the desired spot.

When one uses multiple rows of holograms the result is referred to as "serial multiplexing". FIG. 4 shows a possible raster obtained by serial multiplexing. A large number of the holograms will be near the outer edge of the rotating disc. Thus, it is possible to place the auxiliary mirror 31 within the outer radius or the outer diameter of the disc 10, as shown in FIG. 3, rather than at some distance outside that range (as in U.S. Pat. No. 3,953,105). As shown in FIG. 3 by Ra, the center of the curved mirror 31 is on the axis about which spinner 10 rotates.

Figure 5:
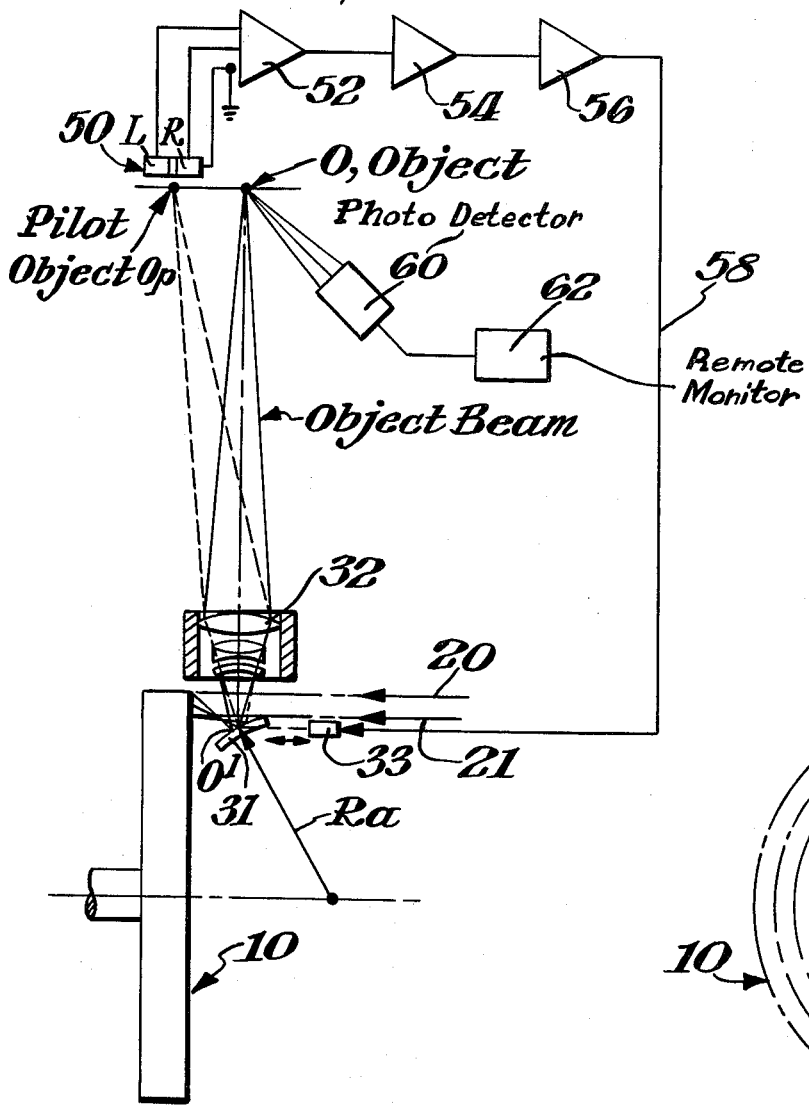
FIG. 5 is a diagrammatic view of a modification of this invention in which a projection lens is used, as well as a servo loop to control the position of the auxiliary reflector.
Figure 6:
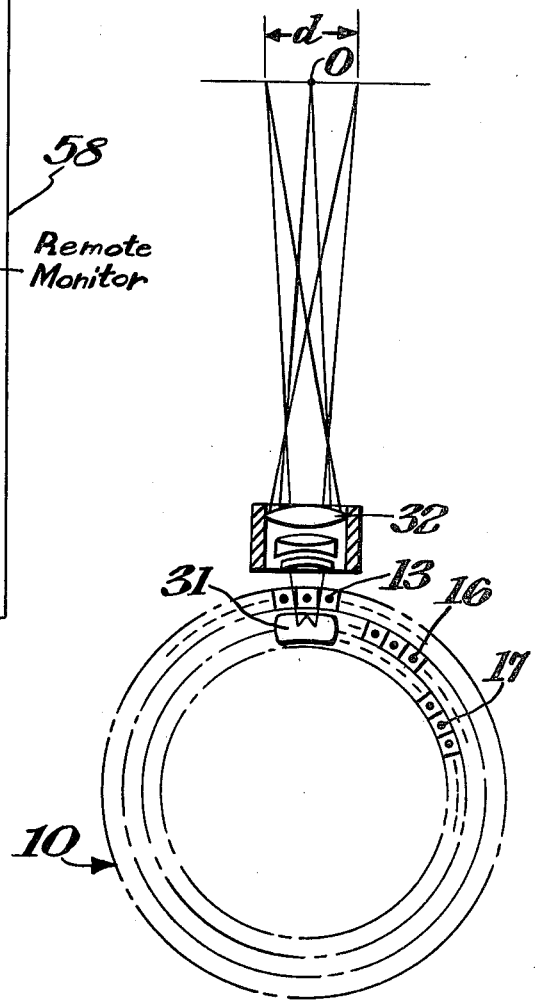
FIG. 6 is an end elevational view of the scanning disc, auxiliary reflector and object and lens system.

In another embodiment shown in FIG. 5, higher resolution than that obtainable by the scanner of FIGS. 1-3 is achieved. In this arrangement, a fast projection lens 32 is used. The total area resolution of the two-dimensional scanner is directly proportional to the diameter of the scanner and inversely proportional to the operative wave length and effective f-number, the latter being the ratio of the effective focal length of the hologram and the effective area of the hologram. A low f-number is needed to obtain a high resolution but such can not physically be obtained using the embodiment shown in FIG. 3. However, with the aid of a fast lens 32, as in FIG. 5, the effective f-number is greatly reduced. As an example, with a scan area of only $1.1 \times 1.1$ mm., the magnification by lens 32 providing an appropriate raster, a resolution of 1,000,000 ($10^6 = 1000 \times 1000$) can be achieved. The resolution requirement of such lens is 1000/1.1 or 900 lines/mm., over the $1.1 \times 1.1$ mm. area. Such lenses of that characteristic are the 30 mm. f/1.2 Ultra-Micro-Nikkor (resolution of 1400/mm. over an area of 2 mm. diameter) and the 28 mm. f/1.7 Ultra-Micro-Nikkor (resolution of 900 lines/mm. over a 6 mm. diameter). The slight field curvature of 0.85 micrometers may require minor modifications of the lens 32, and custom-built lenses to accommodate such field curvatures may be constructed. Lenses can be prepared such that the scanned lines are essentially flat as shown in FIG. 6 instead of being curved as shown in FIG. 2.

Figure 8:
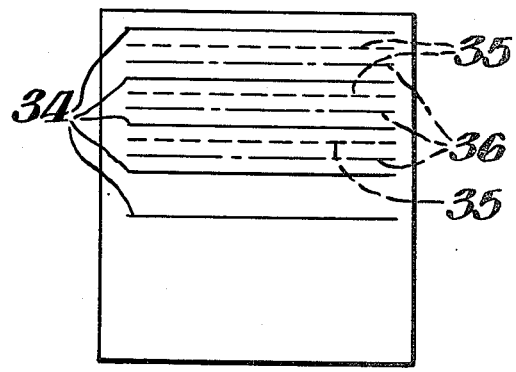
FIG. 8 is a diagram of the raster scan produced when servo-control is employed to minimize aberrations caused by mechanical imperfections in the scanning disc.

With further reference to the term "multiplexing", it is possible according to this invention to increase resolution by routes other than merely increasing the number of rows of holograms (serial multiplexing). In such a further route, a result, referred to as field multiplexing, is achieved by shifting or tilting the auxiliary reflector 31. For example, auxiliary reflector 31 may be shifted or tilted using a piezo-electric translator 33 which makes the reflector 31 move back and forth or tilt as shown in FIG. 5 (arrows). In so doing, scanning lines may be displaced. As shown in FIG. 8, lines 34 are scanned during the first set of revolutions of the disc as a first field by the holograms, while the second field 35, and those in the third field 36, and so on, are scanned by the same holograms in the second set and third set, and so on, of revolutions of the disc, because of the shifting (or tilting) of the auxiliary mirror at the completion of each set of revolutions of the disc. Finally, complex multiplexing can be achieved and is defined herein to be a combination of serial multiplexing and the above-described field multiplexing methods.

Shifting of the auxiliary reflector may be effected upon completion of one revolution of the disc, or upon completion of a set of multiple revolutions equal to the number of rows of holograms on the disc, or upon any desired number of revolutions. Thus, upon the second set of revolutions of the disc, an entirely new field of points is scanned, thereby achieving both serial and field multiplexing of higher resolution than has heretofore been possible.

As shown in FIG. 5, a servo feedback control loop may be utilized to minimize aberrations in scanning. One will appreciate that spinner 10 may wobble during its rotation, and that if it were to do so, the light beams from given holograms would not move in the straight paths shown in FIG. 2 and FIG. 8, but would have wavy paths. In order to prevent that, each hologram can be prepared using a light source from a fixed control point, $O_p$, (which can also be termed a pilot object point) so that during scanning any light beam that might otherwise stray from the desired straight path is forced to go to the object point, O.

In effect, in order to use the auxiliary mirror to dynamically correct the beam positioning, a reference signal is needed. This reference signal can be obtained from the 'pilot' object, $O_p$, as indicated in FIG. 5. During the recording of each hologram, the additional pilot object $O_p$, located outside the range of the object O, is used as a source of light and is simultaneously recorded on the hologram. $O_p$ remains unchanged when the position of O is changed after each hologram is recorded. Therefore, the use of $O_p$ establishes a reference position of all object points. During the scanning operation, with the position of $O_p$ having been fixed in spaced, the positions of the object points can thus be fixed with respect to $O_p$. The position of $O_p$ during scanning can be detected by a 2-quadrant optical detector as shown in FIG. 5 whose outputs are used to control the piezo-electric translator 33 which controls the position of the auxiliary mirror. This completes a closed servo-control loop as shown. By changing the position of $O_p$, the same servo control loop can also perform the field multiplexing discussed above. The control elements described involve conventional equipment well understood by those in the art.

In such control loop, the 2-quadrant detector 50, with isolation barrier between the two detectors L and R parallel to the direction of the scan, is positioned in such a way that the pilot object beam scans along the barrier which separates the two quadrants of the detector. A 2-quadrant detector such as the PIN-Spot/2D manufactured by United Detector Technology, Inc., is suitable. If the pilot object beam scans exactly in the center of the barrier equal voltages will be produced at the left, L, and right, R, detector. Since these voltages are exactly equal, the output of the differential amplifier 52 is zero and no correction voltage will be sent through the servo loop to the piezo-electric translator or tilter 33. The servo loop contains conventional differential amplifier 52 with proper bias for the detector, additional operational amplifier 54 with frequency compensation if needed, high voltage amplifier 56, and feedback path 58.

However, if the pilot object beam shifts away from the center barrier position, different voltages will be produced at L and R. This voltage difference is proportional to the shift of the pilot object beam, which is also the shift of the scanning beam. This shift can be caused by any of many factors such as bearing irregularities, eccentricity of the holograms, the scanner surface not being perpendicular to the rotating axis, and also possible errors during the fabrication of the holograms.

When the optical detector is imbalanced, the voltage difference is first amplified by the differential amplifier and further amplified by the additional operational and high voltage amplifiers. The output of the high voltage amplifier is applied to the piezo-electric translator or tilter in such a way that the shift or tilt of the auxiliary reflector will reduce and correct the scanning error. The combination of these functions, i.e. error detection, voltage amplification causing adjustment of the auxiliary reflector which corrects the scanning beam error is essentially a closed servo-feedback control loop. This operation can be performed extremely rapidly and is a key to dynamic beam scan error correction.

From the above it can be seen that this invention comprises a method and apparatus utilized to perform that method having several steps. First, holograms are constructed and recorded on a scanning disc. During serial multiplex scanning, the disc is rotated and light is directed to the holograms sequentially, first to individual holograms in a given row of the disk (i.e. at a given radius position) and then to holograms arranged in subsequent rows. For the plurality of such holograms, each is prepared with a specific focal point for light diffracted from it. As light is diffracted from each sequential hologram to the surface of said object, the scanning beam illuminates subsequent points on the object, thereby scanning the surface laterally and longitudinally.

Figure 7:
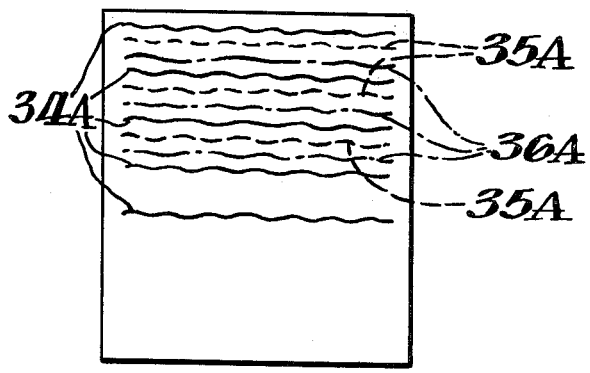
FIG. 7 is a diagram of an exaggerated raster scan produced when the scanning disc wobbles slightly on its axis.

The scan distance is best seen in FIG. 6, which is an end view of the apparatus shown in FIG. 5, wherein the lateral scan distance, d, is indicated. During the rotation of the revolvable element, wobbling or vibration effects may occur that would misdirect the point of light. Therefore a controlling element, the auxiliary reflector, is used to keep a specific point of light in its desired path on or across the surface being scanned. The auxiliary reflector is adjusted by means of the servo-control loop described previously to minimize aberrations in the scan. Without the control loop, raster scans as shown exaggerated in FIG. 7 would result, caused by wobbling of the scanning disc. With servo-control, the raster scan of FIG. 8 is achieved.

Another step comprises the use of a photodetector shown as 60 in FIG. 5 and remove monitor 62, to convert the point of light from each hologram being received in the illumination of the object surface to an electrical signal and to transmit this signal to a place distant from the scanning operation at which place the signals are used to produce an image of the surface(s) scanned.

In another step, a modulating system is used at a distant place. This comprises the use of a system at the distant place which is constructed similarly to the one in use in the scanning operation. The two systems are synchronously run, and the system at the distant place is used to produce the desired image. Since the various pieces of apparatus used as described above, such as the photodetector or the equipment used in converting electrical signals to the desired image, are well-known in the art and do not constitute a separate invention of themselves, no further description or showing of same is presented here for convenience.

The apparatus and methods of this invention afford one a low cost scanning system that operates in a relatively simple manner to accomplish both field and serial multiplexing having higher resolution than otherwise obtainable. The apparatus is readily constructed and the pieces of optical equipment involved are readily available and easily positioned in the system. Further, the system can be operated either in the reflection or transmission mode, and low cost replication results. The system is useful in high speed optical input/output and display applications, in high speed/high resolution scanning optical microscopes, in generating micropatterns and microelectric circuits and in systems effecting images using infra-red, millimeter and microwave radiations or in ultrasonic image systems.

Documents may be scanned and images thereof readily reproduced. Physical objects, such as parts for equipment, may be scanned as well as objects coming to a checker, as in a supermarket, which can be identified and prices tabulated. Thus, the inventions herein have broad applicability.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. Improved apparatus for achieving two-dimensional holographic scanning of an object comprising:
   (a) a rotatable disc having a face, said disc being rotatable about an axis perpendicular to said face of said disc, said face having secured thereon a plurality of holograms, each hologram prepared so as to focus to a specific point on an object to be scanned;
   (b) means for rotating said disc;
   (c) means for illuminating said holograms with light emanating from a light source of coherent radiation, said holograms being so illuminated as they pass through said light during rotation of said disc;
   (d) an auxiliary reflector causing light diffracted from said holograms to be reflected to the object to be scanned, thereby achieving means for serial multiplex scanning of said object during rotation of said disc;
   wherein the improvement comprises
   (e) means for changing the position of said auxiliary reflector in order to change the position of the point of focus of each hologram on the object to be scanned, thereby achieving field multiplexing, whereby, during a first set of revolutions of said disc, a first field of points on said object is scanned, and the position of said auxiliary reflector is then changed, thereby displacing the focus points of said holograms on said object such that, upon a second set of revolutions of said disc, a second field of points on said object is scanned, and so on, thereby providing apparatus for achieving two-dimensional field and serial multiplex scanning of said object.

2. Apparatus in accordance with claim 1, wherein said holograms, during recording, were exposed to a fixed-position pilot object point, the location of which point during scanning is sensed by optical detectors; which apparatus comprises:
   (a) the apparatus of claim 1; and
   (b) the said optical detectors; and
   (c) a closed servo feedback control system for sensing the output of said detectors and adjusting the position of the auxiliary reflector to fix the position of said pilot object point in space using the said means for changing the position of the auxiliary reflector, thereby eliminating scanning aberrations due to mechanical imperfections in said rotating disc.

3. The apparatus of claim 1 wherein said auxiliary reflector is located at a position in front of said face of said disc between the outer diameter of the circle travelled by the outermost holograms on said disc and the axis of rotation of said disc.

4. An improved method for achieving two-dimensional holographic scanning of an object comprising:
   (a) securing upon the face of a rotatable disc a plurality of holograms and preparing each said hologram to focus to a specific point on an object to be scanned;
   (b) rotating said disc;
   (c) illuminating said holograms with light emanating from a light source of coherent radiation, said holograms being so illuminated as they pass through said light during rotation of said disc;
   (d) causing light diffracted from said holograms to be reflected to the object to be scanned using an auxiliary reflector, thereby achieving serial multiplex scanning of said object during rotation of said disc;
   wherein the improvement comprises
   (e) changing the position of said auxiliary reflector in order to change the position of the point of focus of each hologram on the object to be scanned, thereby achieving field multiplexing, whereby, during a first set of revolutions of said disc, a first field of points on said object is scanned, and the position of said auxiliary reflector is then changed, thereby displacing the focus points of said holograms on said object such that, upon a second set of revolutions of said disc, a second field of points on said object is scanned, and so on, thereby achieving two-dimensional field and serial multiplex scanning of said object.

5. The method of claim 4 including:
   (a) exposing said holograms during recording to a fixed-position pilot object point;
   (b) sensing the location of said pilot object point during scanning using optical detectors;
   (c) sending the output signal from said optical detectors through a closed servo feedback control system to the auxiliary reflector positioning means and thereby adjusting the position of the auxiliary reflector to fix the position of said pilot object point in space, thereby eliminating scanning aberrations due to mechanical imperfections in said rotating disc.

6. The method of claim 4 wherein said auxiliary reflector is located at a position in front of said face of said disc between the outer diameter of the circle travelled by the outermost holograms on said disc and the axis of rotation of said disc.

* * * * *